(12) United States Patent
Krauss

(10) Patent No.: US 10,970,116 B2
(45) Date of Patent: Apr. 6, 2021

(54) MEMORY MANAGEMENT APPLICABLE TO DISTRIBUTED DATA STRUCTURES

(71) Applicant: International Business Machines Corporation, Armonk, NY (US)

(72) Inventor: Kirk J. Krauss, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 310 days.

(21) Appl. No.: 15/427,666

(22) Filed: Feb. 8, 2017

(65) Prior Publication Data

US 2018/0225055 A1 Aug. 9, 2018

(51) Int. Cl.
*G06F 12/00* (2006.01)
*G06F 9/50* (2006.01)

(52) U.S. Cl.
CPC .................................. *G06F 9/5016* (2013.01)

(58) Field of Classification Search
CPC ....... G06F 9/467; G06F 12/828; G06F 12/023
See application file for complete search history.

(56) References Cited

U.S. PATENT DOCUMENTS

| | | | |
|---|---|---|---|
| 6,016,529 A | 1/2000 | Woodman | |
| 6,134,627 A * | 10/2000 | Bak | G06F 9/4488 711/6 |
| 7,206,903 B1 * | 4/2007 | Moir | G06F 12/0842 711/130 |
| 9,170,954 B2 | 10/2015 | Muff et al. | |
| 2005/0149903 A1 * | 7/2005 | Archambault | G06F 9/5016 717/100 |
| 2009/0094430 A1 * | 4/2009 | Bergheaud | G06F 9/526 711/163 |
| 2011/0138055 A1 * | 6/2011 | Daly | G06F 9/505 709/226 |

(Continued)

FOREIGN PATENT DOCUMENTS

| | | |
|---|---|---|
| CN | 103942152 A | 7/2014 |
| JP | 4232445 B | 3/2009 |

OTHER PUBLICATIONS

Mel, et al. "The NIST Definition of Cloud Computing". Recommendations of the National Institute of Standards and Technology. Nov. 16, 2015.

(Continued)

*Primary Examiner* — Gurtej Bansal
(74) *Attorney, Agent, or Firm* — Samuel Waldbaum, Esq.; McGinn IP Law Group, PLLC

(57) ABSTRACT

A memory management method, system, and computer program product include receiving a request to allocate a block of memory including a first portion to be accessed by a first software component executing on a first computer and second portion to be accessed by a second software component executing on a second computer, allocating the block of memory and additional bytes including a first identifier of the first portion, a first status indicator associated with the first portion, a second identifier of the second portion, and a second status indicator associated with the second portion, initializing the first status indicator and the second status indicator, and making the block of memory available to the first software component and the second software component.

20 Claims, 5 Drawing Sheets

(56) References Cited

U.S. PATENT DOCUMENTS

2014/0372724 A1* 12/2014 Almasi ................ G06F 12/023
                                                    711/173
2016/0188622 A1   6/2016 Sharangpani

OTHER PUBLICATIONS

Lattner, C., & Adve, V. (2005). "Automatic pool allocation: improving performance by controlling data structure layout in the heap". ACM Sigplan Notices, 40(6), 129-142.

* cited by examiner

MEMORY MANAGEMENT APPLICABLE TO DISTRIBUTED DATA STRUCTURES

BACKGROUND

The present invention relates generally to a memory management method applicable to a cloud computing environment, and more particularly, but not by way of limitation, to a system, method, and computer program product for memory management applicable to a distributed data structure allocated for access by processes running on disparate computers, or nodes.

Memory allocators and deallocators conventionally tack header bytes onto data structures for memory management purposes. In some contexts, such as debug builds on Windows®, the C runtime library provided by the system adds 40 bytes to every allocated block. A custom allocator can provide its own memory block headers for any purpose whatsoever including tracking of blocks.

Distributed data structures have conventionally been implemented in distributed applications via techniques that include shared counters, data-type-specific abstractions and partitioned hash tables. All of these conventional methods require application program overhead.

In the conventional techniques, most stream computing applications are designed to break down problems and to treat each piece of a problem in a linear fashion. In these applications, when stateful operators are parallelized, typically they are placed ahead of an end-result sink such that they operate discretely on a subset of an original data stream and have little or no interaction with one another. Otherwise, distributing the workload via parallelism can change the behavior of the stateful operators. When each parallelized operator sees only a portion of the original stream, even just combining the results without extra care can confuse stateful processing and is typically done only at the "sink" step, limiting architectural flexibility.

However, with the arrival of systems such as distributed stream computing platforms that are designed from the ground up for building distributed applications, there would be an advantage for distributed data structure mechanics to be built into such systems.

SUMMARY

In an exemplary embodiment, the present invention can provide a computer-implemented memory management method, the method including receiving a request to allocate a block of memory comprising a first portion to be accessed by a first software component executing on a first computer and second portion to be accessed by a second software component executing on a second computer, allocating the block of memory and additional bytes comprising a first identifier of the first portion, a first status indicator associated with the first portion, a second identifier of the second portion, and a second status indicator associated with the second portion, initializing the first status indicator and the second status indicator, and making the block of memory available to the first software component and the second software component. One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways that should not be regarded as limiting.

As such, those skilled in the art will appreciate the conception upon which this disclosure is based may readily be utilized as a basis for the design of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
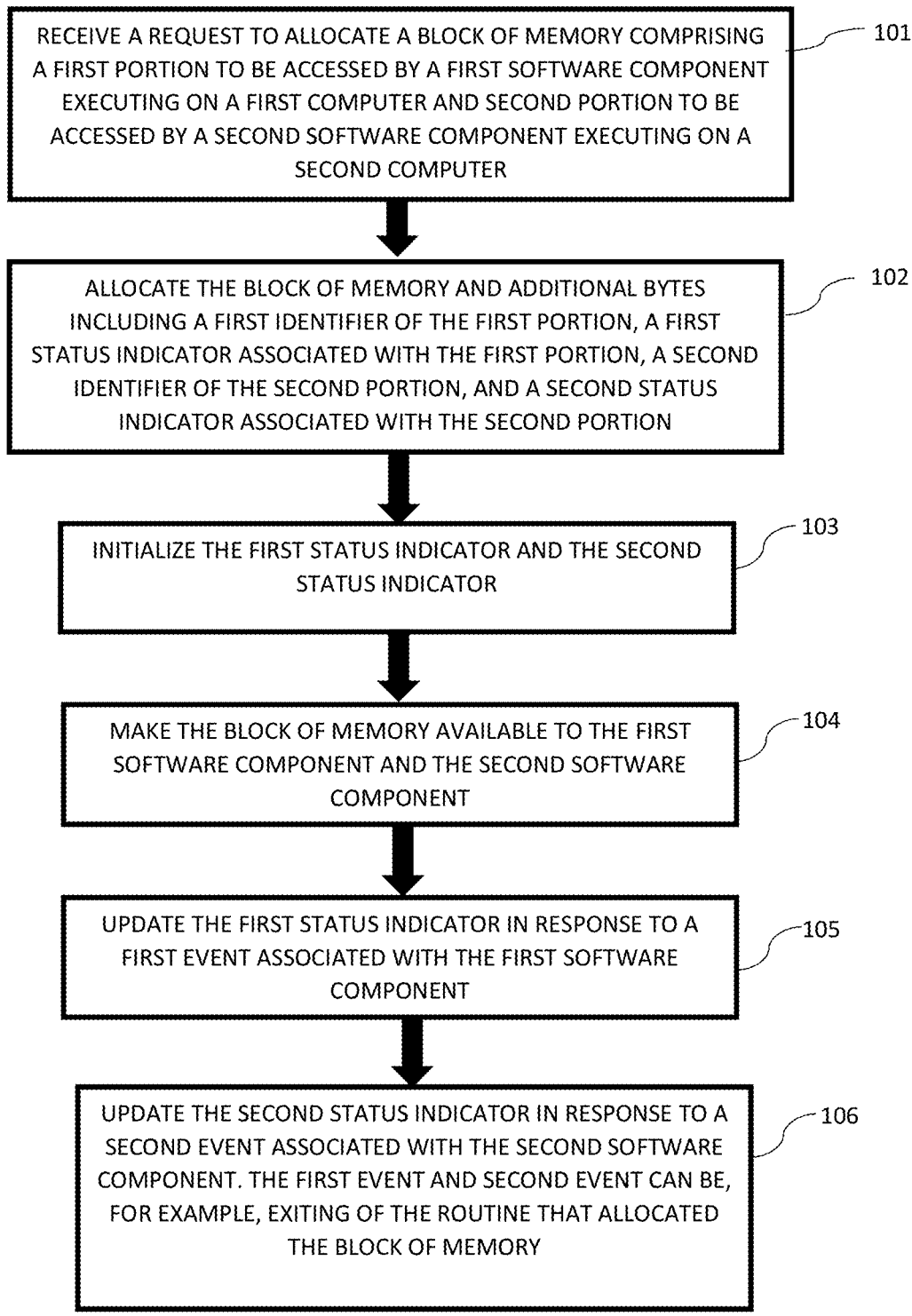
FIG. 1 exemplarily shows a high-level flow chart for a memory management method 100 according to an embodiment of the present invention.

The invention will now be described with reference to FIGS. 1-5, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of a memory management method 100 according to the present invention can include various steps for memory management applicable to a distributed data structure, certain portions of which are allocated for access by certain processes operable on disparate nodes. Such a distributed data structure and associated method can be useful for parallelizing tasks in a streaming data environment. By way of introduction of the example depicted in FIG. 3, one or more computers of a computer system 12 according to an embodiment of the present invention can include a memory 28 having instructions stored in a storage system to perform the steps of FIG. 1.

Referring now generally to the embodiments of the invention, an allocator and a deallocator for a distributed data structure are provided as part of the runtime architecture of a stream computing platform for distributed applications, such as InfoSphere Streams™. A distributed data structure, set up by the allocator, can include header bytes or other metadata indicating (a) which portions of the data structure are operated on independently; and (b) for each portion, a flag designating whether an operation is pending.

The header bytes can, for example, identify data streams with the data structure elements that the data streams may modify. Elements of the data structure are considered out of bounds to a stream if it is not identified with them; debug checks can be provided to call out such illegal access.

Coders can use keywords or other indicators associated with the allocator to correlate operators with the portions of a data structure on which they will operate. A compiler can recognize the keywords via templates, a language extension, etc. For example, a C++ library implementation, such as the implementation for any of several C++ Standard Template Library (STL) data structures, can accept an allocator template parameter that controls allocations made by that entity during execution. A data structure that is distributed via an embodiment, such as a template that controls the arrangement of header bytes or other metadata in accordance with the distributed data structure arrangement of the invention, can be farmed out to multiple nodes at runtime. In embodiments, a template library, a runtime library, or a management module can set the pending operation flags for all portions of the distributed data structure. In some embodiments, each flag can remain set until access to the relevant portion of the data structure has been completed, at which time each such flag can be cleared. In other embodiments, each such flag can remain clear until each such access has been completed, at which time each such flag can be set. Via flag checking, operators that rely on the combined result can be made, automatically or by explicit programming, to either wait until all operations are complete or to continue with awareness of a partially indeterminate state.

That is, the invention can simply provide parallelism in stream computing, for improved parallelism opportunities, by building a helpful style of distributed data structure into the stream computing (or other distributed system) architecture. The invention is not limited to stream computing uses and can be applied to other distributed, or distributable, architectures. For example, the invention can be used in the context of cognitive computing. Cognitive computing can include application of various machine learning systems or algorithms trained on a common corpus of information. In association with a response to any given situation, the various machine learning systems or algorithms each can provide a score. Each score can be representative of the confidence or relevance of the response. A cognitive system can choose a response, from a set of responses from the various machine learning systems or algorithms, based on the provided scores. In this manner, the cognitive system can make effective use of a variety of machine learning systems or algorithms. In an embodiment in which all or part of the cognitive system is built via a compiler that assists with management of a distributed data structure shared by machine learning systems or algorithms that run on multiple nodes in parallel, the responses and scores can be stored in the distributed data structure. Prior to farming out a given situation to a set of various machine learning systems or algorithms in the interest in obtaining responses and scores, the scores can be initialized to zero. The various machine learning systems or algorithms can be expected to return non-zero scores upon completion of their processing of the situation. At any time after the situation has been farmed out, a resulting score can be calculated based on the results that have been obtained by some of the machine learning systems or algorithms while others of them continue processing, and a percentage of completion for the entire set of machine learning systems or algorithms can be presented. This functionality can be entirely based on the state of a single instance of the distributed data structure as established by directives recognized by the compiler, without requiring further synchronization involving the machine learning systems or algorithms or their output. Thus, a distributed data structure allocated as contemplated by the present invention can simplify or enhance computing in contexts other than the stream computing examples provided elsewhere herein. However, the distributed data structure is particularly well suited to simplify or enhance stream computing.

For example, in one embodiment, a stream computing system can compute an indefinite set of large prime numbers that are close in value (i.e., two ordinals apart). A primary node can hand off a thousand-digit odd number to a second node to determine whether it is prime and can hand off the subsequent odd number to a third node to determine whether that subsequent odd number is also prime. This hand-off could be scaled to any number of nodes (e.g., a fourth, fifth, etc.). Using a distributed data structure, consisting of the set of numbers and their status as primes, the second through nth nodes can let a downstream operator at the first node know which of the numbers are prime. If two subsequent odd numbers are both prime, that downstream operator can go on to indicate them in the result set. It can go on to farm out another set of odd numbers to the other nodes. Synchronization or communication is thus not required for anything besides the data structure itself between the various operators and nodes. As a result, greater efficiency in processing results.

A programming language such as C++, SPL, or Spade can be arranged, via a template or a language extension, to recognize a keyword such as "distributed" or "distributed to" in a data structure definition. The distributed to keyword can identify a specific operator. Also, a further extension, such as a "complete" keyword, can be used to indicate when an operation on a value in a data structure is complete.

For example, the following pseudo code is typical of a conventional data structure accessible by two nodes that determine, independently, whether a value (big_number) is prime.

```
typedef struct prospective_prime{
    char *big_number;
    bool bIsPrime;
};
```

In conjunction with this conventional pseudo code, logic is needed to be implemented to recognize and assess the Boolean flag and to synchronize on whether its state has changed, for each node working with an instance of this conventional data structure. Logic in multiple places, intended for execution across multiple nodes, would also have to agree on how this is to be accomplished. This conventional paradigm is complex and bug-prone.

However, using the invention and method 100, keywords can designate the values as pending. The underlying runtime could then handle the entire situation for the below exemplary pseudo code:

```
typedef struct prospective_prime{
    char *big_number;
    distributed bool bIsPrime;
};
```

With the invention, the Boolean value in any instance of the structure is agreed to be pending until an event associated with it has occurred.

For example, if with the above structure, two operators, designated "N1" and "N2", are going to determine whether separate values of big_number are prime, then two copies of prospective_prime can be allocated. Each node can be assigned a copy. When one of them has determined that its big_number value is, or is not, prime, it can accordingly set its bIsPrimeflag. It can use the complete keyword (or equivalent) to indicate that it is done with the processing that updates the flag. Alternatively, it can exit the routine that processes the flag. The compiler in the method 100 can be extended to recognize that the scope of processing is complete, for such a flag, and can arrange for the indicator to be set on its own, i.e. without the use of a keyword such as complete. Thus, data structures for which processing by an operator is completed can be made available for use by separate machines, nodes, etc., without explicit coding of logic or synchronization related to the completion status.

In an embodiment that relies on the complete keyword, code for determining a prime number can be represented as the following pseudo code:

```
process_input (prospective_prime *p){
    p -> bIsPrime = is_prime (p -> big_number);
    complete p -> bIsPrime;
};
```

The compiler can be set up to recognize these keywords. It can arrange calls to standard allocators, but with memory block headers added to embody the invention. These can contain any or all of the following: for example, an indication that the block contains data to be considered pending until one or more completion events occurs, one or more offsets to any such data items in the block, one or more node identifiers associated with those data items, an indication of what constitutes a completion event, etc. The invention is not limited to use with a compiler; the keywords also may be recognized by an interpreter, a pre-compiler, or some other software development environment construct.

Figure 2:
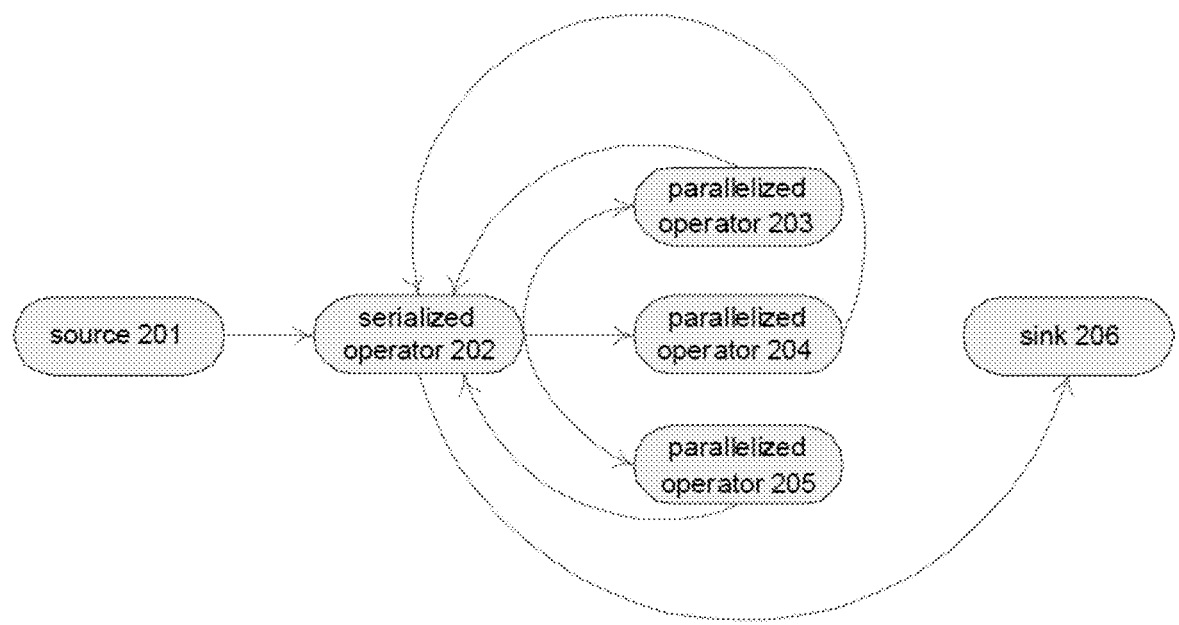
FIG. 2 exemplarily depicts an arrangement of operators in a stream computing design.

Referring now to FIG. 2, FIG. 2 exemplarily depicts an arrangement of operators in a stream computing design. A stream computing application program built according to the invention could have operators arranged in conditional configurations, and in loops, without compromising the safety of stateful operations. Thus the invention frees up streaming application developers from the design constraints of the conventional techniques, allowing much more flexibility in the arrangement of operators.

That is, nodes can share data structures by keeping them in shared memory, or in a distributed address space. For relatively large structures, this makes access to a particular value or flag very fast, compared to having to transmit an entire structure as part of a data stream.

Referring now to FIG. 1, in step 101, a request is received to allocate a block of memory comprising a first portion to be accessed by a first software component executing on a first computer and a second portion to be accessed by a second software component executing on a second computer. The request can take the form of a call to a function or method that allocates memory, such as malloc( ) in C/C++. The request also can take the form of the allocation of a data structure, or instantiation an object of a class, whose definition includes keywords, such as distributed or distributed to, or other indicators that are recognized as being applicable to first and second portions of the block of memory to be accessed by the first and second software components, respectively.

In step 102, the block of memory is allocated, and additional bytes are allocated including a first identifier of the first portion of the block of memory, a first status indicator associated with the first portion of the block of memory, a second identifier of the second portion of the block of memory, and a second status indicator associated with the second portion of the block of memory. The additional bytes may be situated in a "header" portion of the instantiated data structure or object class. The additional bytes also may be situated in metadata stored in a separate structure or class. The additional bytes may be memory-resident on the first computer, the second computer, both the first and second computers, or one or more other computers. The additional bytes also may be persisted via media attached to one or more computers.

In step 103, the first status indicator and the second status indicator are initialized. The initialization can be performed by code generated based on recognition of the keywords or other indicators. The initialization can be formed within the context of the function or method that allocates memory, or the instantiation of the data structure or object class whose definition includes keywords or other indicators that are recognized as being applicable to the first and second portions of the block of memory.

In step 104, the block of memory is made available to the first software component and the second software component. The first and second software components can consider the block of memory to be available, upon return of control from the function or method that allocates memory or from the instantiation of the data structure or object class whose definition includes keywords or other indicators that are recognized as being applicable to the first and second portions of the block of memory.

In step 105, the first status indicator is updated in response to a first event associated with the first software component. The first event can be the execution of code generated according to the complete keyword or other indicator recognized as being applicable to either the first portion of the block of memory. The first event also can be the exiting of a first function or method. The first event also can be the deallocation of the data structure allocated, or destruction of the object instantiated, in step 101. The first event also can be the updating of a first status indicator by explicitly coded means, by implicit means, or in response to completion of processing by a software component.

In step 106, the second status indicator is updated in response to a second event associated with the second software component. The second event can be the execution of code generated according to the complete keyword or other indicator recognized as being applicable to the second portion of the block of memory. The second event also can be the exiting of a second function or method. The second event also can be the deallocation of the data structure allocated, or destruction of the object instantiated, in step 101. The second event also can be the updating of a second status indicator by explicitly coded means, by implicit means, or in response to completion of processing by a software component.

It is noted that the first software component and the second software component can include instances of an identical software component. An example of two instances of an identical software component is two objects of a class. Other examples include, but are not limited to, a library or module loaded on two nodes, a virtual machine operable on two nodes, and a data structure that is allocated in two memory address ranges. It is also noted that the additional bytes can be allocated as a portion of the requested memory block or as all or part of a data structure separate from the requested memory block.

Further, the first event and the second event can include one or more of an explicitly programmed status indication, an implicit status indication, the exiting of a specific routine, and completion of processing by a software component. The specific routine can be determined via a compiler.

Therefore, the steps 101-106 can provide an environment, such as a stream computing environment, that is designed from the ground up for building distributed systems, with several advantages. One advantage is code simplification, such that management of portions of a distributed data structure usable by the various nodes need not require the overhead of writing complete code, for each application that relies on the distributed data structure or a similar data structure, to partition and manage the portions. Further, large distributed data structures can be shared, among nodes, without transmitting all of the data in a structure as part of every data stream that is passed to every node; rather, only the part of the distributed data structure relevant to a given node need be transmitted to that node.

Also, a set of stream computing operators that rely on a distributed data structure managed according to the invention can be arranged in conditional configurations, and in loops, without compromising the safety of stateful operations. Feedback and conditional results processing are enabled by the invention, in the stream computing context, as shown in FIG. 2. The three parallelized instances of a first operator, as shown in that figure, can each operate on a portion of a data stream and can indicate completion of a subset of operations to a serialized second operator that divides processing among the instances of the first operator. Depending on conditions such as the status of the parallelized first operators, or their results, or their performance, the second operator can make new distribution decisions as further data comes in. The second operator also can make decisions as to when processing results are ready to be sent onward, for example to the sink shown in FIG. 2. Even without operator synchronization other than that provided by the invention, the second operator can combine results with respect to the three parallelized first operators and forward them to the sink, having awareness of the completion status of the result. Thus the invention enables stateful parallel processing in stream computing environments that accommodates feedback and conditional results without requiring added synchronization.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of distributed computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
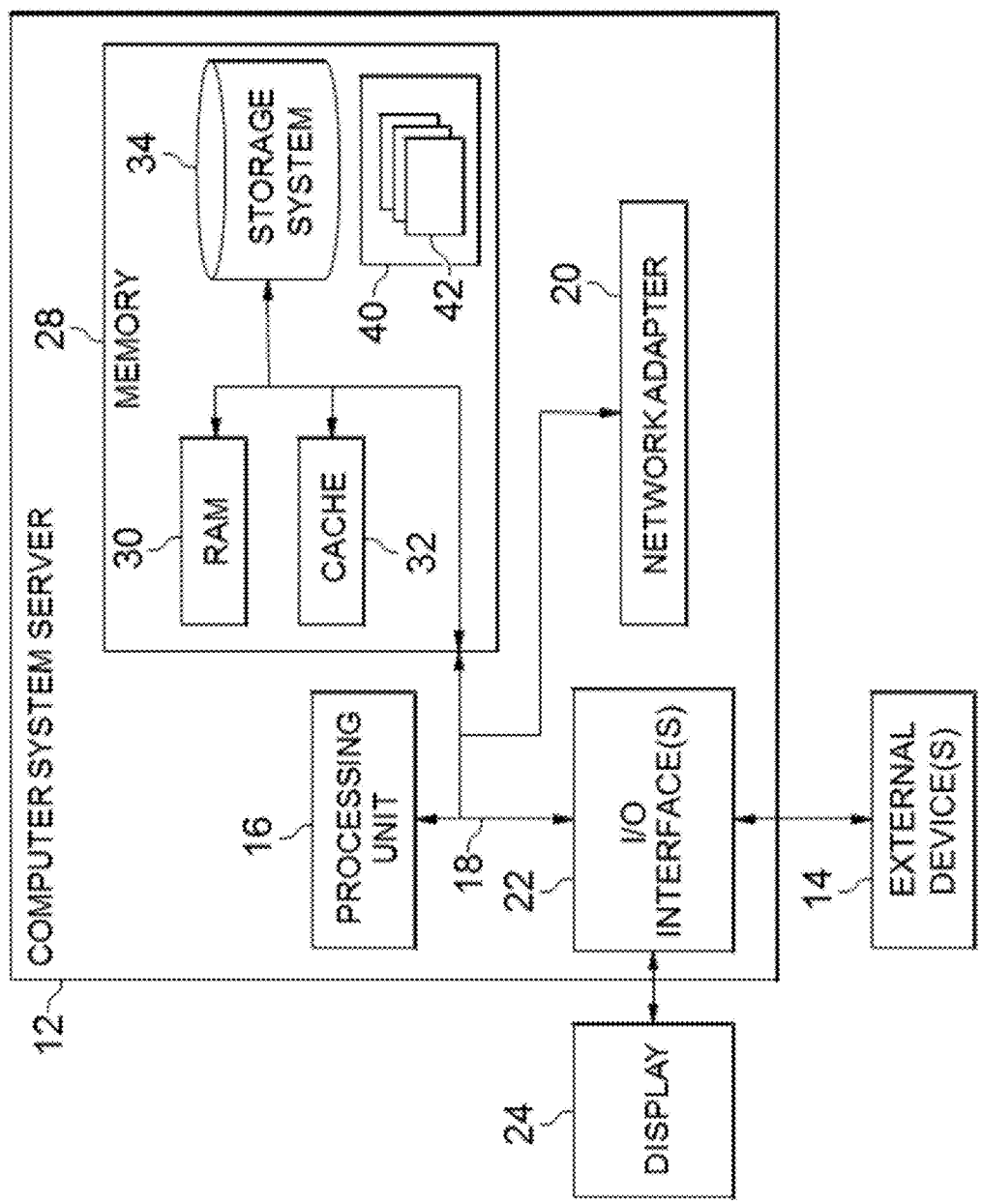
FIG. 3 depicts a cloud-computing node 10 according to an embodiment of the present invention.

Referring now to FIG. 3, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 3, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or more program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
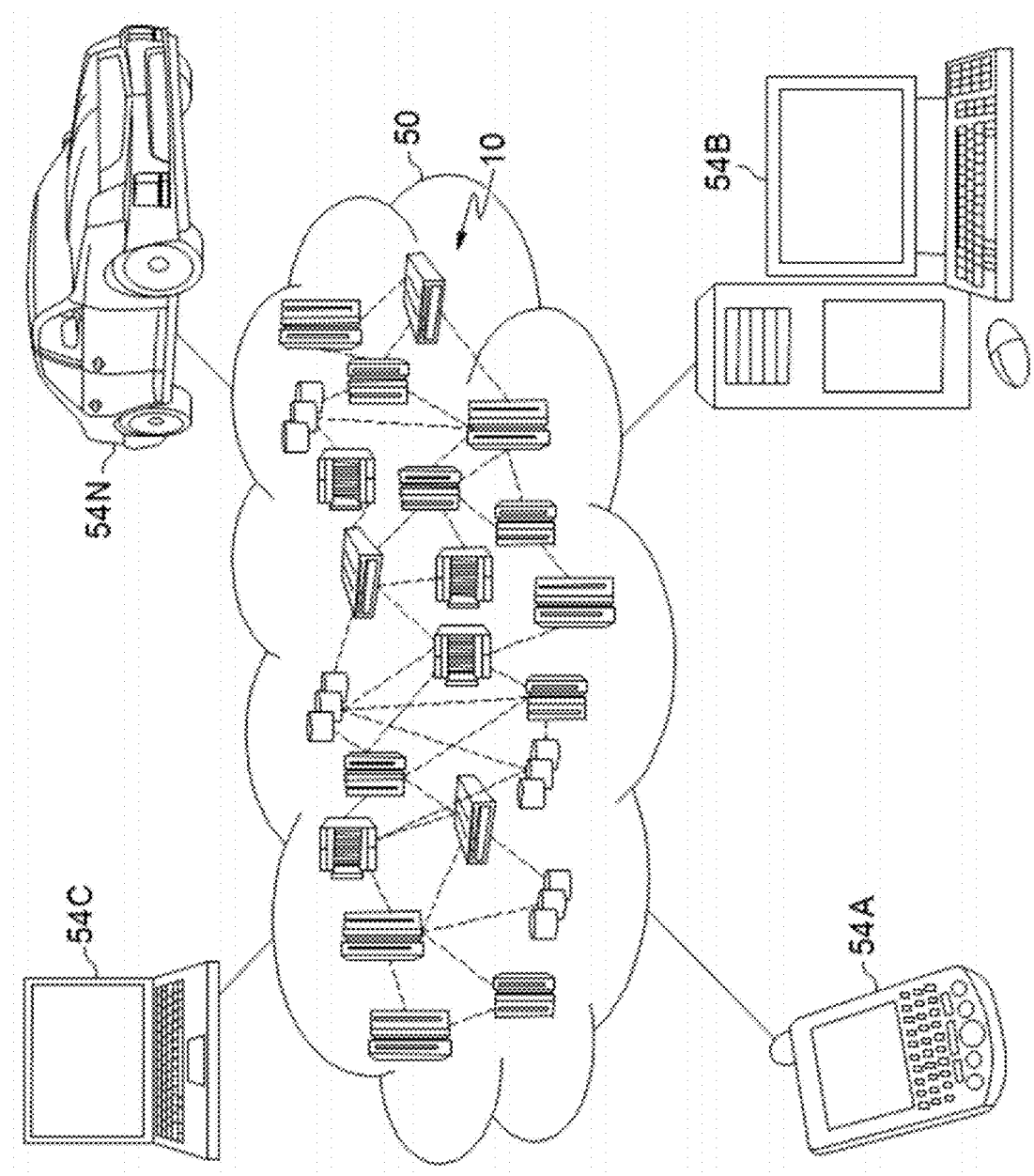
FIG. 4 depicts a cloud-computing environment 50 according to an embodiment of the present invention.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
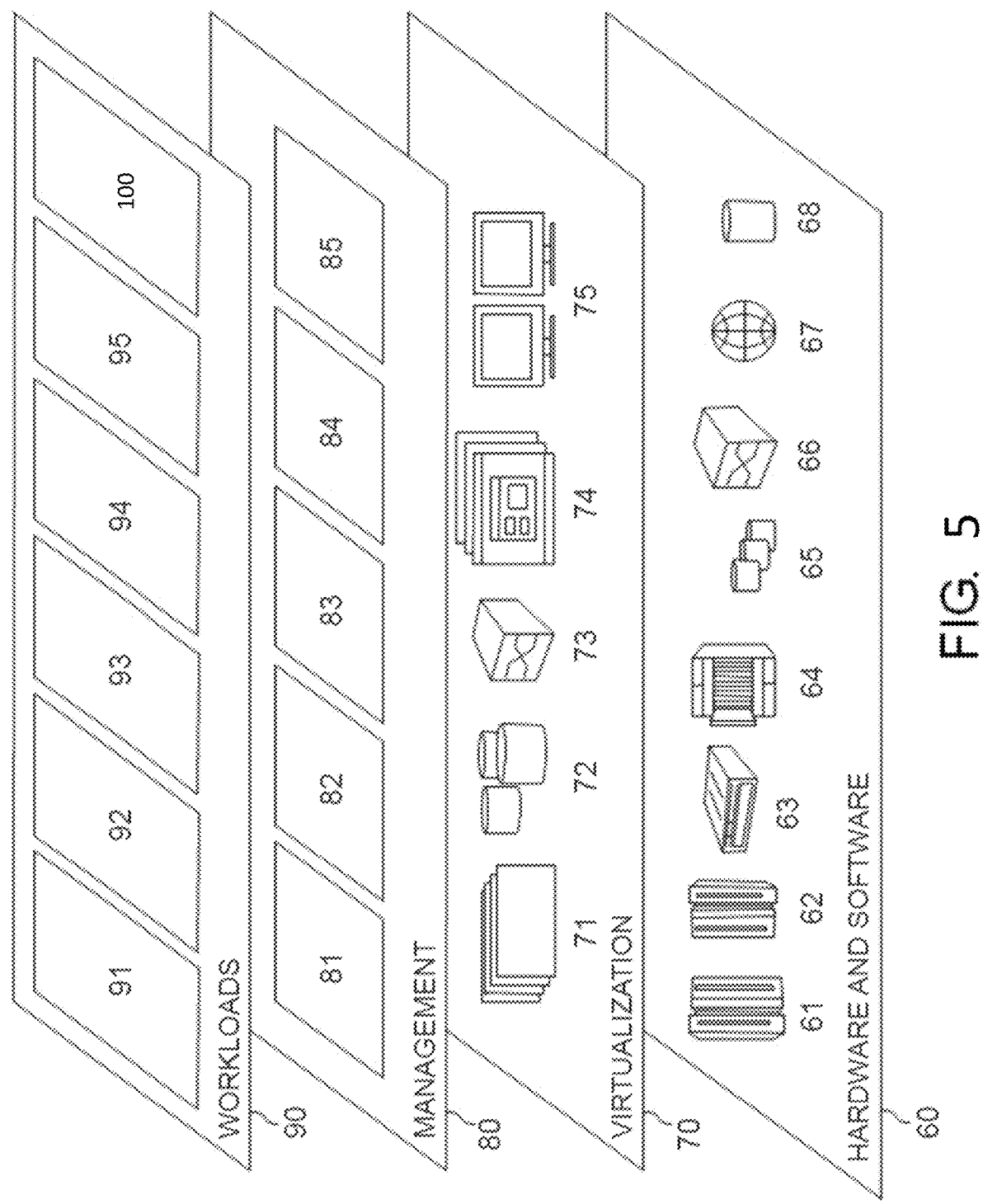
FIG. 5 depicts abstraction model layers according to an embodiment of the present invention.

Referring now to FIG. 5, an exemplary set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and memory management method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), a Storage Area Network (SAN), a Network Attached Storage (NAS) device, a Redundant Array of Independent Discs (RAID), an erasable programmable read-only memory (EPROM or Flash memory), a static random access memory (SRAM), a portable compact disc read-only memory (CD-ROM), a digital versatile disk (DVD), a memory stick, a USB "thumb" drive, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented memory management method, the method comprising:
    receiving, during stream computing, a request to allocate a block of memory including a distributed data structure comprising a first portion to be accessed by a first software component operable on a first computer and a second portion to be accessed by a second software component operable on a second computer;
    allocating the block of memory and additional bytes comprising a first identifier of the first portion, a first status indicator associated with the first portion, a second identifier of the second portion, and a second status indicator associated with the second portion;
    initializing the first status indicator and the second status indicator; and
    making the block of memory available to the first software component and the second software component,
    wherein the block of memory is made available to the first software component and the second software component, in a parallel manner, based on the initializing of the first and second status indicators,
    wherein, the distributed data structure includes a set of numbers and a status as primes, a second through $n^{th}$ nodes are let a downstream operator at a first node that knows which of the numbers are prime, and
    wherein, if two subsequent odd numbers are both prime, that downstream operator indicates the two subsequent odd numbers in the result set.

2. The computer-implemented method of claim 1, wherein the first software component and the second software component comprise instances of an identical software component, and
    wherein another set of odd numbers to the other nodes is farmed, thereby synchronization is thus not required besides for the data structure itself between the various operators and nodes.

3. The computer-implemented method of claim 1, wherein the additional bytes are allocated as a portion of the requested memory block.

4. The computer-implemented method of claim 1, embodied in a cloud-computing environment.

5. The computer-implemented method of claim 1, further comprising:
    updating the first status indicator in response to a first event associated with the first software component; and
    updating the second status indicator in response to a second event associated with the second software component,
    wherein another set of odd numbers to the other nodes is farmed, thereby synchronization is thus not required besides for the data structure itself between the various operators and nodes.

6. The computer-implemented method of claim 5, wherein the first event and the second event comprise at least one of an explicitly programmed status indication, an implicit status indication, an exiting of a specific routine, and a completion of processing by the first software component or the second software component.

7. The computer-implemented method of claim 6, wherein the specific routine is determined via a compiler.

8. The computer-implemented method of claim 6, wherein the specific routine is determined via a programming language interpreter.

9. A computer program product for memory management, the computer program product comprising a computer-readable storage medium having program instructions embodied therewith, the program instructions executable by a computer to cause the computer to perform:
- receiving, during stream computing, a request to allocate a block of memory including a distributed data structure comprising a first portion to be accessed by a first software component operable on a first computer and a second portion to be accessed by a second software component operable on a second computer;
- allocating the block of memory and additional bytes comprising a first identifier of the first portion, a first status indicator associated with the first portion, a second identifier of the second portion, and a second status indicator associated with the second portion;
- initializing the first status indicator and the second status indicator; and
- making the block of memory available to the first software component and the second software component,
- wherein the block of memory is made available to the first software component and the second software component, in a parallel manner, based on the initializing of the first and second status indicators,
- wherein, the distributed data structure includes a set of numbers and a status as primes, a second through $n^{th}$ nodes are let a downstream operator at a first node that knows which of the numbers are prime, and
- wherein, if two subsequent odd numbers are both prime, that downstream operator indicates the two subsequent odd numbers in the result set.

10. The computer program product of claim 9, wherein the first software component and the second software component comprise instances of an identical software component.

11. The computer program product of claim 9, wherein the additional bytes are allocated as a portion of the requested memory block.

12. The computer program product of claim 9, further comprising:
- updating the first status indicator in response to a first event associated with the first software component; and
- updating the second status indicator in response to a second event associated with the second software component.

13. The computer program product of claim 12, wherein the first event and the second event comprise at least one of an explicitly programmed status indication, an implicit status indication, an exiting of a specific routine, and completion of processing by the first software component or the second software component.

14. A memory management system, said system comprising:
- a processor; and
- a memory, the memory storing instructions to cause the processor to perform:
  - receiving, during stream computing, a request to allocate a block of memory including a distributed data structure comprising a first portion to be accessed by a first software component operable on a first computer and a second portion to be accessed by a second software component operable on a second computer;
  - allocating the block of memory and additional bytes comprising a first identifier of the first portion, a first status indicator associated with the first portion, a second identifier of the second portion, and a second status indicator associated with the second portion;
  - initializing the first status indicator and the second status indicator; and
  - making the block of memory available to the first software component and the second software component,
  - wherein the block of memory is made available to the first software component and the second software component, in a parallel manner, based on the initializing of the first and second status indicators,
  - wherein the distributed data, structure includes a set of numbers and a status as primes, a second through $n^{th}$ nodes are let a downstream operator at a first node that knows which of the numbers are prime, and
  - wherein, if two subsequent odd numbers are both prime, that downstream operator indicates the two subsequent odd numbers in the result set.

15. The system of claim 14, wherein the first software component and the second software component comprise instances of the second software component.

16. The system of claim 14, wherein the additional bytes are allocated as a portion of the requested memory block.

17. The system of claim 14, embodied in a cloud-computing environment.

18. The system of claim 14, further comprising:
- updating the first status indicator in response to a first event associated with the first software component; and
- updating the second status indicator in response to a second event associated with the second software component.

19. The system of claim 18, wherein the first event and the second event comprise at least one of an explicitly programmed status indication, an implicit status indication, an exiting of a specific routine, and completion of processing by the first software component or the second software component.

20. The system of claim 19, wherein the specific routine is determined via a compiler.

* * * * *